Dec. 29, 1959     C. HOLLERITH ET AL     2,918,775
SELF-PROPELLED ROTARY MOWER
Filed Oct. 25, 1955     5 Sheets-Sheet 1
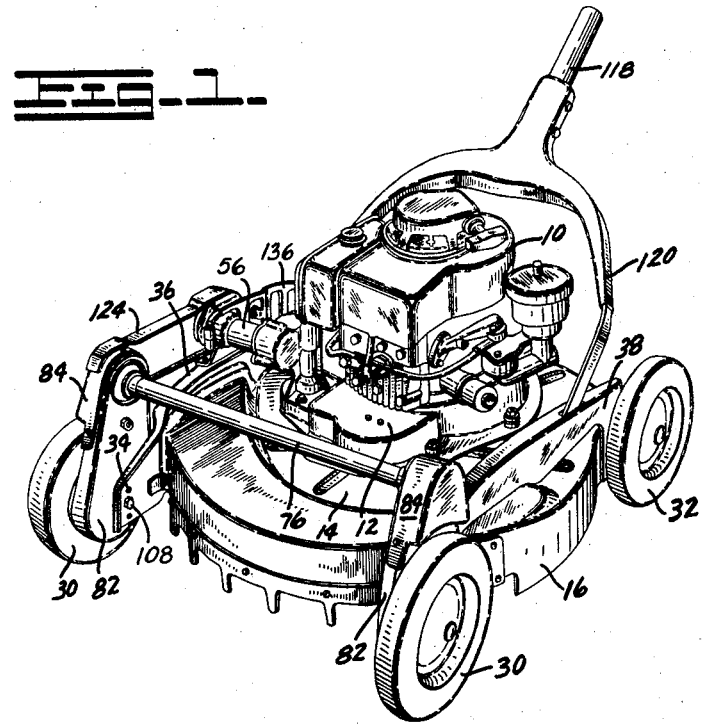
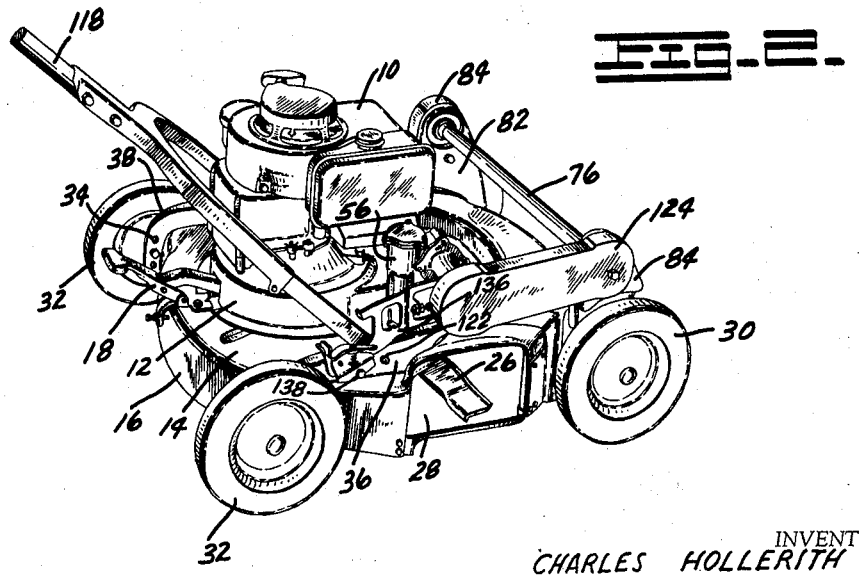
INVENTORS
CHARLES HOLLERITH
JOHN C. FLANSBURGH
DARRELL C. WHITE
BY *Torrsen & W Beaman*
ATTORNEY

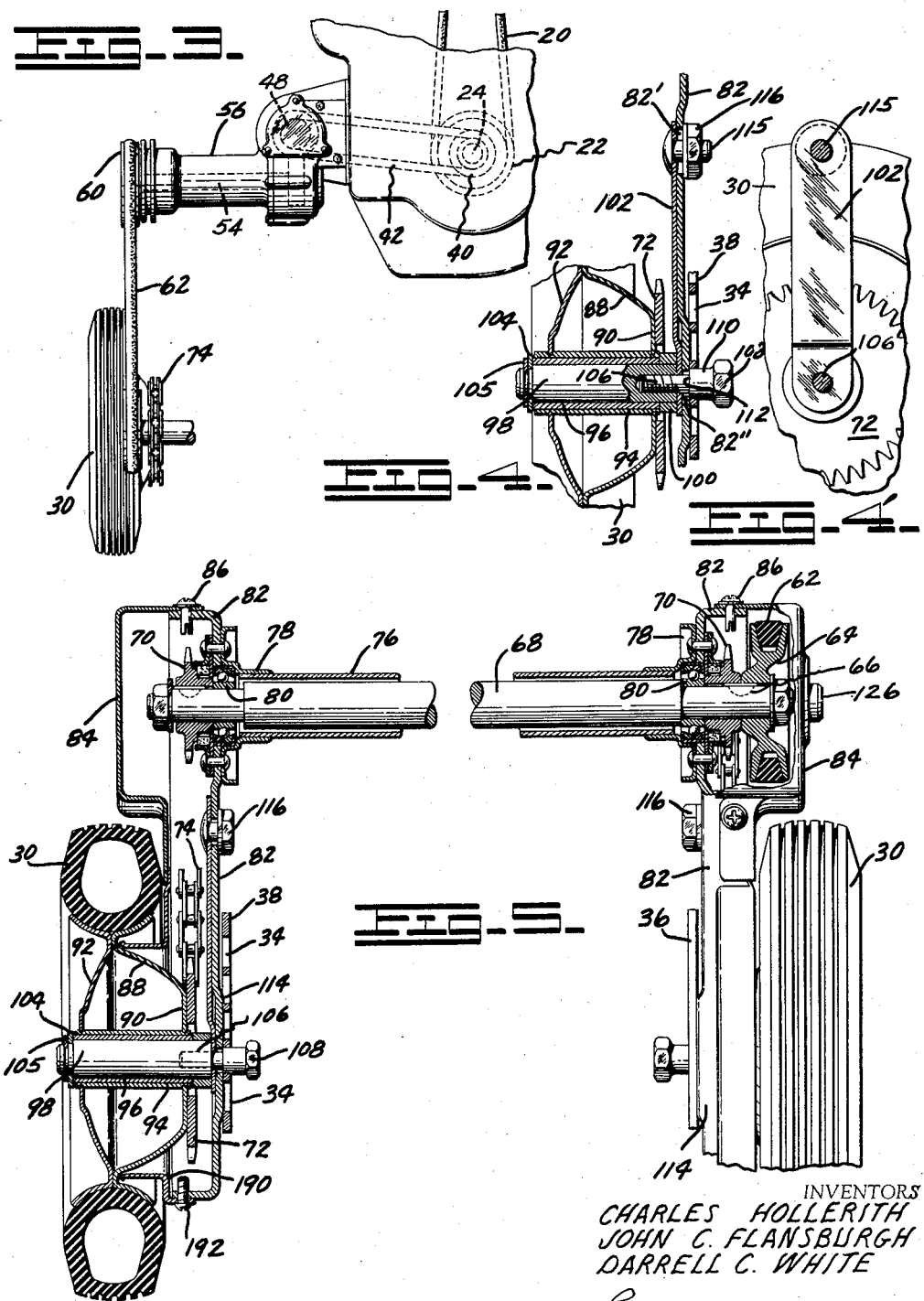

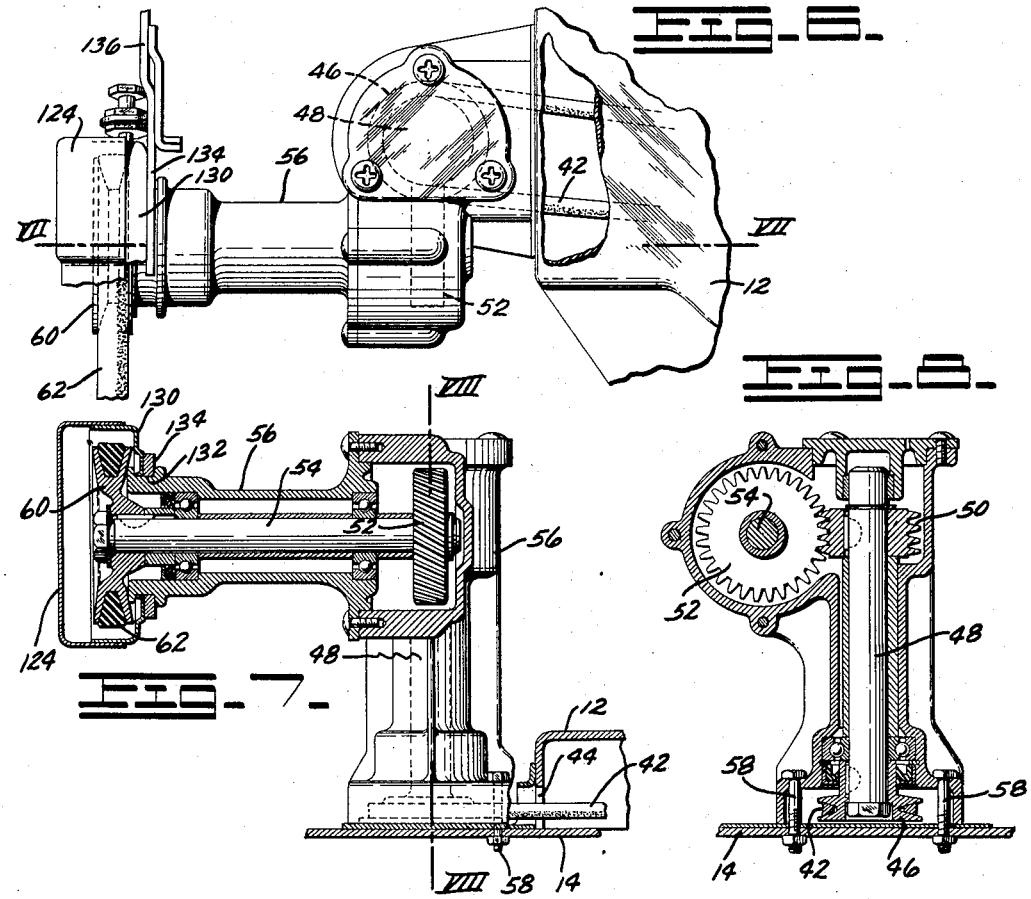
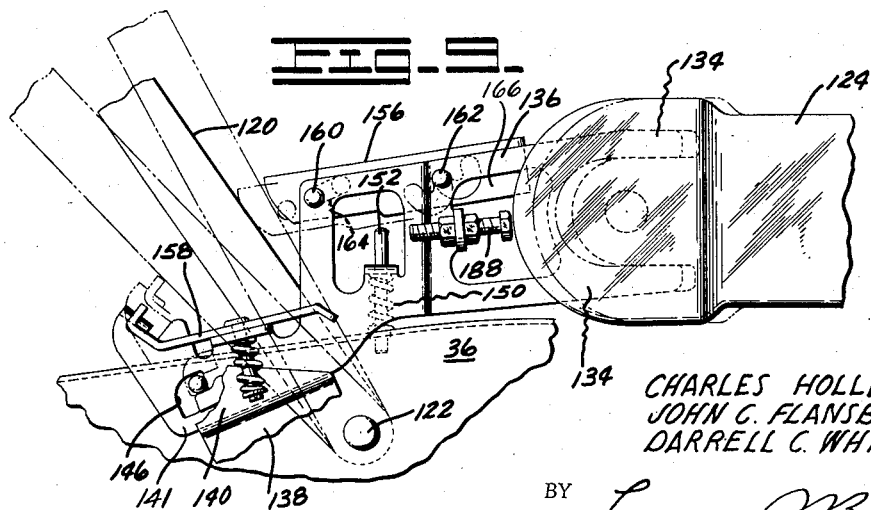

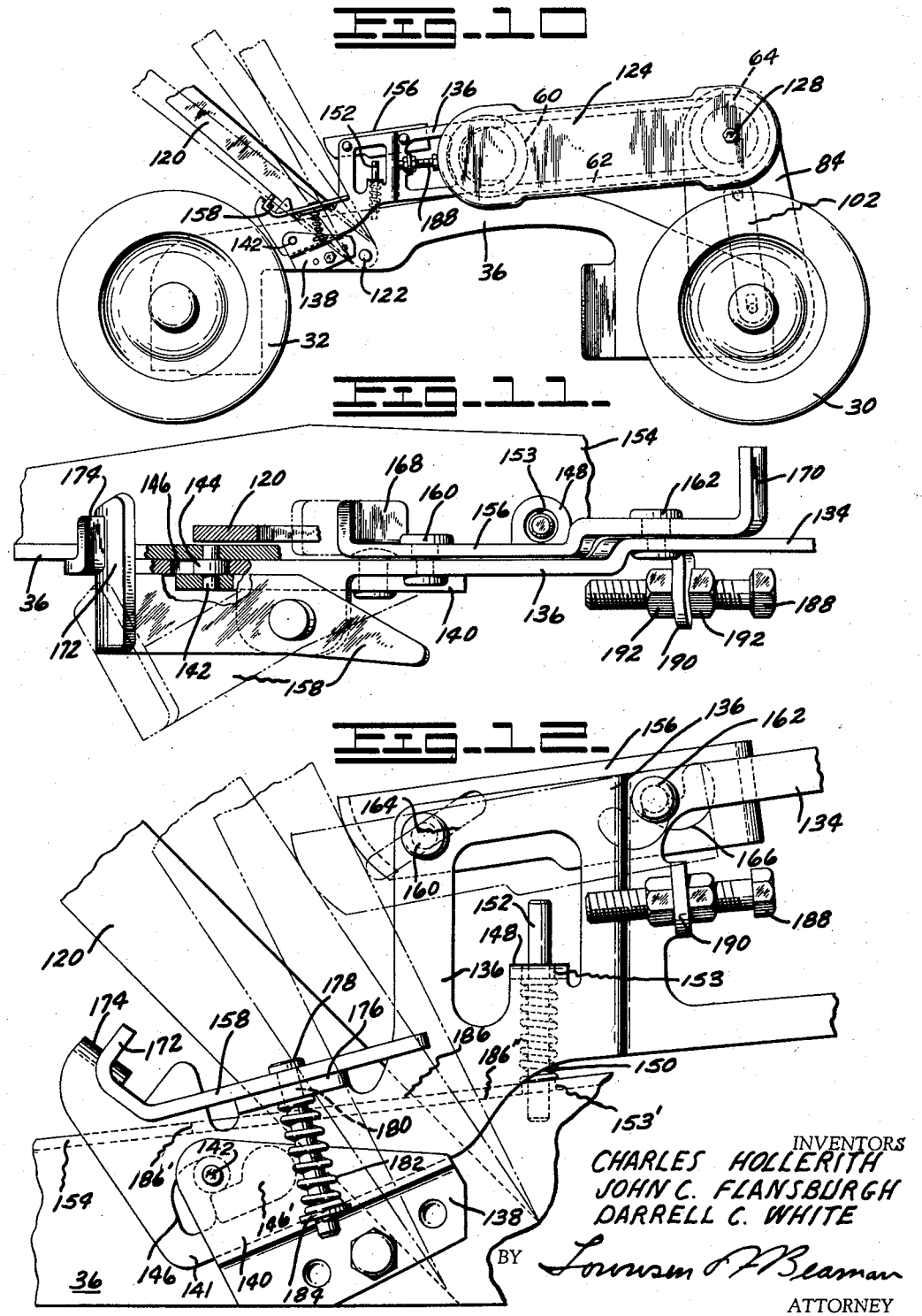

Dec. 29, 1959  C. HOLLERITH ET AL  2,918,775
SELF-PROPELLED ROTARY MOWER
Filed Oct. 25, 1955  5 Sheets-Sheet 5
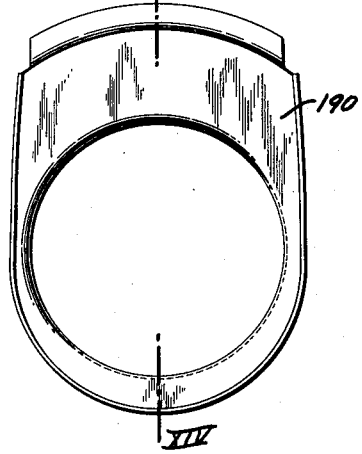
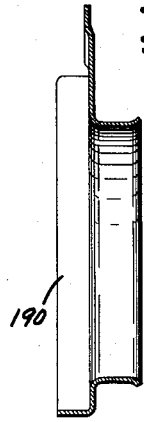
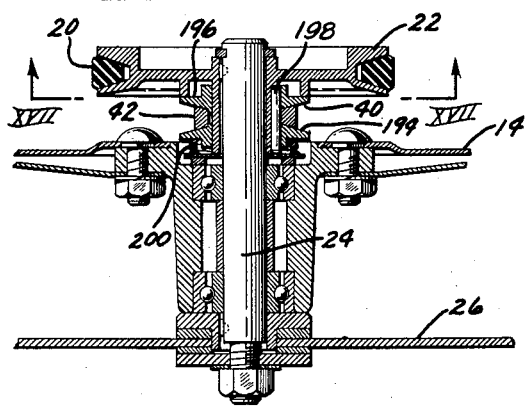
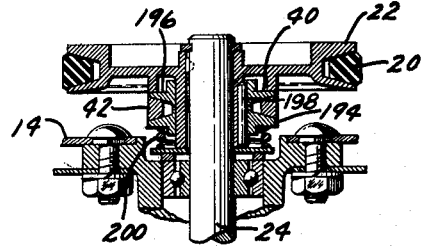
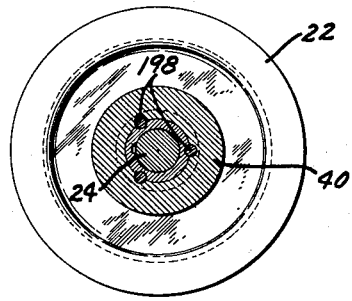
INVENTORS
CHARLES HOLLERITH
JOHN C. FLANSBURGH
DARRELL C. WHITE
BY
ATTORNEY

United States Patent Office 2,918,775
Patented Dec. 29, 1959

2,918,775

SELF-PROPELLED ROTARY MOWER

Charles Hollerith, Jackson, John C. Flansburgh, Michigan Center, and Darrell C. White, Jackson, Mich., assignors to Yard-Man, Inc., Jackson, Mich.

Application October 25, 1955, Serial No. 542,745

4 Claims. (Cl. 56—25.4)

The present invention relates to improvements in lawn mowers of the type having a cutting blade, disc or the like rotated about a substantially vertical axis. Mowers of this type cut equally well regardless of the direction in which they are moved over the ground. Also, because of their arcuate cutting operation, the ground wheels may be so located as to permit trimming directly adjacent walls, trees and other obstacles. Especially when equipped with light weight engines with vertical crank shafts, lawn mowers of the aforesaid type (known in the trade as "rotary mowers") possess a great deal of flexible utility and operational ease notwithstanding the necessity of manually propelling the mower during the cutting operation.

While it has heretofore been proposed to drive one or more ground wheels of rotary type lawn mowers from the same prime mover driving the cutting element, all such proposals to our knowledge have resulted in a material sacrifice of mobility and ease of manipulation as compared to the manually propelled rotary mower in which only the cutting element is motorized.

According to the present invention, we have provided an improved rotary lawn mower in which one or more of the ground wheels is selectively driven without material sacrifice of any of the inherent advantages of the lighter weight, manually propelled rotary lawn mower.

Several features have contributed to this accomplishment. One has been the development of a novel front wheel drive which is of light weight construction and which does not complicate the regulation of the cutting height. Another contributing feature resides in the employment of the arcuate movement of the standard guiding handle of manual mowers for rendering the front wheel drive active and inactive. A further feature is found in the simple and inexpensive manner in which control of the drive wheels through the arcuate manipulation of the guiding handle may be modified by the operator to adapt the lawn mower to various cutting conditions.

Thus an object of the invention is to provide a novel and improved power take off and ground wheel drive mechanism for rotary lawn mowers which provides for ease of belt adjustment and tightening as well as adjustment of cutting height.

Another object resides in the novel structure and arrangement for the selective drive of the ground wheels and the simple modification of the actuation mechanism therefor to provide either continuous forward drive of the driven wheels or complete manual propulsion.

A further object of the invention resides in the provision of an improved power driven rotary lawn mower having forwardly driven front ground wheels and a rearwardly extending guiding handle for manual propulsion in a rearward direction and elevation of the front wheel about the rear wheel as a fulcrum.

These and other objects and advantages residing in specific details of construction and combination of parts will more fully appear from the following description and claims.

In the drawings:

Fig. 1 is a perspective view of a lawn mower embodying the present invention,

Fig. 2 is a view similar to Fig. 1 and taken from a different angle,

Fig. 3 is a fragmentary showing of the wheel drive mechanism with the belt guard removed, Fig. 4 is a fragmentary sectional view of the front wheel adjustable mounting, Fig. 4' is a fragmentary elevational view of a portion of the structure shown in Fig. 4, Fig. 5 is a front elevational view of the front wheel assembly partly shown in vertical section, Fig. 6 is an enlarged fragmentary plan view of a portion of the wheel drive shown in Fig. 3, Fig. 7 is a sectional view taken on line VII—VII of Fig. 6, Fig. 8 is a sectional view taken on line VIII—VIII of Fig. 7, Fig. 9 is an enlarged fragmentary view in side elevation of the handle actuated control mechanism for the selective control of the front wheel drive, Fig. 10 is a side elevational view of wheel drive assembly and control, Fig. 11 is an enlarged plan view of the control mechanism shown in Fig. 9, Fig. 12 is an enlarged elevational view of the control mechanism shown in Fig. 9, Fig. 13 is a side elevational view of the dirt guard for the front wheels, Fig. 14 is a sectional view taken on line XIV—XIV of Fig. 13, Fig. 15 is a vertical sectional view of the cutting blade drive shaft and wheel drive power take off pulley, Fig. 16 is a fragmentary view of Fig. 15 showing the self adjustment belt tightening feature of the power take off pulley, and Fig. 17 is a sectional view taken on line XVII—XVII of Fig. 15.

The principles of the present invention are shown applied to a rotary lawn mower of the basic construction disclosed in United States Patent No. 2,861,410, filed August 26, 1953. As disclosed the engine 10 has a vertical crank shaft and it is mounted upon the base 12 which is supported for limited to and fro movement on the flat upper surface 14 of the main housing and frame 16 upon actuation of the toggle control lever 18 to tighten and loosen the belt 20 running to the pulley 22 on the vertical shaft 24 upon which the cutting blade 26 is carried at the lower end thereof. Rotation of the blade 26 will cut the grass, weeds and the like and discharge them through the opening 28 in the housing 16. The forward ground wheels 30 and the rearward ground wheels 32 are carried upon stub axles adjustably positioned in the series of vertical holes 34 located in the end portion of truss members 36 and 38 rigidly attached to the housing 16 to vary the cutting height of the blade 26.

The foregoing described structure constitutes the essential portion of the manually propelled rotary lawn mower disclosed in the aforesaid application and forms no part of the present invention.

According to the present invention the modification of the manually propelled rotary lawn mower to provide power drive without material sacrifice of the operational advantages of the manual mower comprises the addition of the pulley 40 upon the vertical driven shaft 24 upon which the blade 26 is carried. A belt 42 extends through an elongated opening 44 in the base 12 and drives the pulley 46 keyed to the vertical shaft 48 carrying the worm 50 which in turn meshes with the worm gear 52 on horizontal shaft 54. A housing 56 attached by bolts 58 to the surface 14 of the housing 16 gives support to the shafts 48 and 54 through suitable bearing as shown. The pulley 60 on the outer end of the shaft 54 constitutes the power take off for the drive of the front wheel 30, its speed of rotation having been materially reduced by the worm and gear arrangement as compared to the rotation of the shaft 24 which drives the blade 26. To avoid adjustment in service of the housing 56 relative to the shaft 24, the V-belt 42 as well as the pulleys 40 and 46 may be of well known cog construction. However, we prefer a self adjustment take up structure for belt 42 as will be described herein.

To accomplish the driving of the front wheel 30, in the illustrated form of the invention, a belt 62 runs between the pulley 60 on the shaft 54 and a pulley 64 keyed at 66 to the cross shaft 68. Sprockets 70 likewise keyed to the shaft 68 are aligned with sprockets 72 on the front wheels 30 to drive the latter through the chains 74.

The structural housing for the shaft 68 and associated drive structure for the front wheels 30 comprises a rigid assembly of a cross tube or housing 76 having cupped flanges 78 welded at opposite ends in which the bearings 80 for the shaft 68 are supported. Riveted to the flanges 78 are the main housing members 82 shaped to receive the sprockets 70 and 72 and the chain 74. Removable end covers 84 held in position by screw 86 cap the exposed ends of the shaft 68 and associated structure.

Each front wheel 30 is shown of stamped sheet metal construction with the sprockets 72 welded to the inside wheel member 88 at 90. Between the wheel members 88 and 92 is a hub 94 carrying a sleeve bearing 96.

The structure for rotatably supporting the wheels 30 each comprise a stub axle 98 pressed in a spacer 100 with an arm 102 welded to the spacer 100. With the wheel 30 mounted on the axle 98, one end of the sleeve bearing 96 abuts the spacer 100 while a washer 104 abuts the other end of the sleeve bearing 96 and a spring retainer washer 105 laterally assembled upon a reduced portion of the axle 98 holds the wheel 30 on the axle 98. The axle 98 is drilled and tapped at 106 to receive the pivot screw 108.

As more clearly shown in Fig. 4, the pivot screws 108 have several functions. They are selectively inserted into the holes 34 in the members 36 and 38 to vary the height of cut. Each screw 108 has a cylindrical portion 110 terminating in a shoulder 112. The portion 110 is closely fitted in the selected hole 34 and constitutes a pivot about which the cross shaft 68 and associated structure is rocked to tighten and loosen the belt 62 on the pulley 64. When the shoulder 112 is drawn against the portion of the housing 82 which defines the hole therein through which the screw 108 projects by rotation of the screw 108 in the threaded hole 106 of the axle 98 the head of the bolt 108 is spaced from the face of the member 38 to prevent binding. By rigidly spacing the members 36 and 38 and providing the bosses 114 on the housing members 82, lateral displacement of the shaft 68 in its assembled relation to the members 36 and 38 is avoided while permitting relative pivotal movement about the axis of the screws 108.

To permit limited relative adjustment between the sprockets 70 and 72, enlarged or elongated holes 82' and 82" may be provided in the housing members 82. This enables the axle 98 and arm 102 to have relative vertical movement relative to the members 82 and shaft 68. The bolts 115 have clearance in the holes 82' and they are held against rotation in the arms 102 so that the nuts 116 may be tightened and loosened to adjust the position of the axles 98 relative to the shaft 68.

Structure for rocking the front wheel drive assembly, comprising the housing structures 76, 82 and 84, about the axis of the screws 108 may take many forms. As it is considered preferable to control the wheel drive through a simple pivotal action of the usual guiding handle 118, having forked arms 120 pivoted on pins 122 supported on the members 36 and 38, to this end a housing 124 is provided which has the dual function of (1) shielding and projecting the belt 62 away from its bite with the pulleys 60 and 64 when the belt 62 is slackened and, (2) acting as part of the structure for rocking the wheel drive assembly to tighten the belt 62. In practice the housing 124 is formed to have limited rocking movement about the axis of the boss 126 carried upon the right hand housing member 84, as seen in Fig. 5, and held in position by a stud and nut assembly 128. To support and guide the housing 124 for limited rocking and longitudinal movements, at its left hand end as seen in Fig. 2, a generally semicircular flange portion 130 is provided which rests in the annular groove 132 of the fixed housing 56. With this arrangement, when the front wheel drive assembly is rocked about the axis of the screws 108, the housing 124 will move back and forth with the assembly with a slight pivotal movement about the axis of the boss 126 at one end and limited rocking and relative longitudinal movement at the other end in the groove 132.

Also supported in the groove 132, along with the flange 130 of the housing 124, is the forked end 134 of the drive actuator bracket 136. This arrangement guides the front or right hand end of the bracket 136 as shown in Figs. 9 to 12, inclusive, while the back end of the bracket 136 is guided between the outer face of member 36 and the flange plate 138 attached to 36 and having an offset portion at 140 parallel to the face of the member 36 to provide a slot in which the portion 141 of the bracket 136 slides. A pin 142 supplied between the member 36 and portion 140 (Fig. 11) has an enlarged portion 144 received in the L-shaped slot 146 in the bracket 136 to define the path of movement of one end of the actuation bracket 136. Preferably a portion of the slot 146 is defined by a hardened insert 146' carried by the bracket 136. An inturned ear 148 on the bracket 136 acts as an abutment for the upper end of the compression spring 150, guided on the pin 152; which is loosely disposed in the holes 153 and 153' located in the flange 154 and the ear 148, respectively, to permit rocking of the pin 152 during to and fro movement of the bracket 136 as permitted by the shape of the L-slot 146. The lower end of the spring 150 reacts against the flange 154 of the member 36 to continuously urge the bracket 136 upwardly as permitted by the shape of the L-slot 146.

Movement of the bracket 136 by the pivotal movement of handle member 120 takes place upon engagement by the member 120 of the abutments 156 and 158 which are preferably adjustable to vary the conditions of control of the drive of the front wheels 30 by the pivotal movement of the handle portion 120. As shown the abutment 156 is guided and supported on the bracket 136 by shoulder rivets 160 and 162 disposed in an elongated straight slot 164 and a semicircular slot 166, respectively. The end 168 of the abutment 156 is turned to be disposed in the path of travel of the handle portion 120 when the abutment 156 is disposed in the dotted line portion of Fig. 12. By manually lifting the forward end of the abutment 156, upwardly and forwardly by the portion 170, the abutment 156 may be shifted into the inactive position shown in full line in Fig. 12. This movement shifts the location of the rivet 162 from one end of the slot 166 to the other.

The adjustable abutment 158 has a bevelled shaped flange portion 172 which is normally engaged over and supported by an inturned portion 174 of the bracket 136. An outturned portion 176 on the bracket 136 supports the abutment 158 for pivotal movement about the axis of the pin 178 carried by the abutment 158 and passing thru a hole 180 in the portion 176 with which it has sufficient clearance to enable the abutment 158 to be rocked upon the portion 176 sufficiently for the bevelled portion 172 to engage and disengage the portion 174. A compression spring 182 on the pin 178 reacts between the under side of the portion 176 and an abutment washer 184 on the pin 178 to continuously urge the abutment 158 into the full line position of Fig. 12. With the abutment 158 in the full line position of Fig. 11, the flange portion 172 is located in the permitted path of pivotal movement of the handle portion 120. When the abutment 158 is manually pivoted into the dotted line position of Fig. 11, the arc of pivotal movement of the handle 118 above the pivots 122, as limited by the movement of the member 120 in the slot 186 in the flange 154 of the member 36 is such that the portion 120 engages the end 186′ of the slot 186 before it can engage the portion 174 of the bracket 136. Thus with the abutment 158 in the inactive dotted line position of Fig. 11, the bracket 136 can not be shifted by anticlockwise pivotal movement of the handle portion 120, as viewed in Fig. 10. Likewise with the abutment 156 in the full line position of Fig. 11, the bracket 136 can not be shifted by clockwise pivotal movement of the handle portion 120 as viewed in Fig. 10, as the handle portion engages the end 186″ of the slot 136 before it can engage the portion 168.

The operating connection between the actuator bracket 136 and the housing 124 takes the form of an adjustable abutment screw 188 cammed on the out turned ear 190 of the bracket 136. Lock nuts 192 located upon opposite sides of the ear 190 determine the projection of the screw 188 the end of which abuts one end of the housing 124 to shift the same to the right as viewed in Fig. 10 to tighten the belt 62. As the belt 62 stretches in use the projection of the screw 188 to the right as viewed in Fig. 10 may be increased to increase the movement of the housing 124 to the right. When the bracket 136 is shifted to the left as viewed in Fig. 10, it has been found in practice that the stretch of the belt 62 and the center of gravity of the front wheel drive assembly will move the housing 124 sufficiently to the left to interrupt the drive. This action may be augmented by a suitable tension spring (not shown) or other equivalent structure extending between the housing 82 or 124 and a pin structure located on the member 36.

It will be understod that when the height of cut of the blade 26 is adjusted that movement of the pivot screws 108, from the top holes 34 to the next lower holes 34, for example will result in the housing 124 being rocked slightly clockwise as viewed in Fig. 10 above its support with the annular groove 132 and the housing 82 will be rocked slightly anticlockwise as viewed in Fig. 10. However, the center distance between the shafts 54 and 68 and between the shaft 68 and axles 98 will remain the same.

When it is desired to render the front wheel drive inoperative, the handle portion 120 engages the abutment 158 in its dotted line position of Fig. 9 to shift the bracket 136 to the left into the full line position to remove the abutment 188 from contact with the housing 124. This permits the housing 124 to assume a slacked belt position. If the abutment 156 is then manually shifted into its full line position of Fig. 12 the portion 168 is disposed out of the permitted pivotal range of the handle portion 120 and the latter may be raised and lowered to manually propel the mower without actuation of the front wheel drive mechanism.

With the abutment 158 in the full line position of Fig. 9, if the abutment 156 is manually shifted into the dotted line or operative position of Fig. 9, movement of the handle portion 120 in opposite directions will shift the bracket 136 back and forth to tighten and loosen the belt 62 to selectively drive the front wheel 30 by merely raising and lowering the handle 118 to alternatively engage the abutments 156 and 158.

Under some conditions it is desirable that the front wheels 30 be continuously driven and yet permit the front wheels 30 to be lifted from the ground by lowering the handle 118 to pivot the mower about the point of contact of the rear wheels 32 with the ground. This may be readily accomplished by shifting the abutment 158 into the dotted line position of Fig. 11 which disposes the portion 172 out of the path of the handle portion 120. As the portion 174 of the bracket 136 is located outside of the permitted pivotal range of the handle portion 120 it will not be engaged and the end 186′ of the slot 186 becomes the limiting abutment for the handle portion 120 and tilting of the front end of the mower will result when the handle 118 is sufficiently lowered yet the bracket 136 will not be shifted and the drive of the front wheel 30 will not be interrupted.

During the normal operations of the mower the abutments 156 and 158 will be located within the pivotal range of the handle portion 120. Thus, the operator may clutch and declutch the front wheel drive at will by merely raising or lowering the handle 118 from a neutral front range in which the handle portion 120 is out of contact with abutments 156 and 158. However, if front wheel drive is not desired by the operator as when heavy cutting conditions are experienced or for any other reason, by manually shifting the abutment 156 into its inoperative full line position of Figs. 9 and 12, the driving of the front wheels 30 by the engine 10 cannot be effected by raising the handle 118.

To continuously drive the front wheels, with the abutment 156 in its operative position (dotted outline in Fig. 12), the abutment 158 is manually shifted into its inoperative position (dotted outline in Fig. 11). Then when the handle portion 120 is raised it will engage the abutment 156 to force the actuator bracket 136 to the right as viewed in Fig. 12 to bring the abutment 188 into engagement with the housing 124 to tighten the belt 62. This movement of the bracket 136 will locate the portion 144 in the opposite end of the slot 146 from that shown in Fig. 12 where it is held by the stress of the spring 150 and the belt 62 will be continuously tightened. If the handle portion 120 is fully lowered, as the abutment 158 is located out of the path of the portion 120, the latter will engage the end 186′ of the slot 186. Down pressure on the handle 118 will lift the front wheel 30 but the bracket 136 will not be shifted and the wheel 30 will continue to rotate. In this manner the lawn mower may be backed up manually with the wheel 30 slightly raised from the ground to avoid tearing the turf and then by easing the pressure on the handle 118 forward drive takes place without shifting the bracket 136. This arrangement provides ease of manipulation in trimming, turning corners etc.

In conducting extensive tests of the present invention, under certain conditions of dust and moisture it was found desirable to provide the wheels 30 with the shields 190 shown in detail on Figs. 13 and 14 and shown held in position in Fig. 5 by screws 192.

To assure the proper tensioning of the belt 42 in service it is convenient to provide a suitable arrangement for automatically tightening the same as wear and stretch takes place. As illustrated in Figs. 15 to 17, the pulley 40 has a two part sheave with the part 194 relatively axially movable to the part 196 on the pins 198. A spring 200 continuously acts against the part 194 and tends in effect to increase the diameter of the pulley 40 to maintain a uniform tension between the belt 42 and the pulleys 40 and 46.

Having thus described our invention, what we claim as new and desire to protect by Letters Patent is:

1. In combination with a lawn mower having a main structure, a prime mover operatively associated with a cutting blade mounted on said main structure, a guiding handle pivotally connected to said structure and forward and back stop structure for defining the pivotal limits of said handle relative to said structure, a ground wheel supported by said structure and adapted to be driven by said prime mover, and a selective drive connection between said prime mover and said wheel, of an actuator for said selective drive connection comprising transitory means operatively connected to said drive connection, a part of said means being disposed in the plane of the pivot path of a portion of said guiding handle, said means including a pair of abutments selectively positionable into the path of said guiding handle portion within the pivotal limits of said stops whereby transitory movement in opposite directions may be imparted to said means to control said drive connection.

2. In the combination of claim 1 wherein one of said abutments is a clutching abutment to be engaged by said handle portion to drive said wheel, the other of said abutments is a declutching abutment to be engaged by said handle portion to interrupt the drive of said wheels, said abutments being manually and independently adjustable between operative and inoperative position relative to the pivotal limit defined by said stops whereby either one or both of said stops may be engaged by said handle to manipulate said main structure without operating said actuator means.

3. In a lawn mower, in combination, a main support structure, a motor mounted on said structure operatively associated with a cutter blade, a power take off fixedly carried upon said structure and having a driven belt pulley having a fixed axis of rotation, a pair of driven ground wheels for said main support structure, a unitary support structure for said wheels comprising a rigid inverted U-shaped housing having vertical and horizontal portions, axial shafts for said wheels located in the vertical portions of said housing, driven means affixed to said wheels, drive mechanism for said wheels mounted in said housing operatively associated with said driven means and including a cross shaft housed within the horizontal portion of said housing, a belt pulley on said cross shaft, means pivotally supporting said housing about the axis of said wheels on said main support structure, a drive belt extending between said pulleys, and means operatively associated with said housing for rocking said housing about its pivotal support to vary the tension upon said belt to selectively drive said wheels.

4. In a lawn mower, in combination, a main support structure, a motor mounted on said structure operatively associated with a cutting blade, a power take off fixedly carried upon said structure and having a driven belt pulley having a fixed axis of rotation, a pair of spaced driven ground wheels vertically positionable upon said support structure, driven means affixed to said wheels, a driven means housing encompassing each of said driven means, said housings being disposed in spaced, substantially parallel relation, axial shafts for said wheels located within said housings, a tubular housing rigidly interconnecting and interposed between said driven means housings wherein said driven means housings and said tubular housing define a unitary U-shaped structure, a cross shaft having a belt pulley affixed thereto and drive means affixed thereon operatively associated with said driven means journaled within said tubular housing, said U-shaped structure being pivotally connected to said support structure by said axial shafts, a drive belt extending between said pulleys and means operatively associated with said U-shaped structure for rocking said U-shaped structure about said axial shafts to vary the tension upon said belt to selectively drive said wheels.

References Cited in the file of this patent

UNITED STATES PATENTS

| | | |
|---|---|---|
| 2,513,685 | Smith et al. | July 4, 1950 |
| 2,598,768 | Donald | June 3, 1952 |
| 2,701,436 | Hartnett | Feb. 8, 1955 |
| 2,708,484 | Hoffman | May 17, 1955 |
| 2,740,246 | Smith et al. | Apr. 3, 1956 |
| 2,760,589 | Rudman | Aug. 28, 1956 |
| 2,787,107 | Strasel | Apr. 2, 1957 |
| 2,795,914 | Smith | June 18, 1957 |